United States Patent [19]

Miyazaki et al.

[11] Patent Number: 4,956,247
[45] Date of Patent: Sep. 11, 1990

[54] NONAQUEOUS ELECTROLYTE SECONDARY CELL

[75] Inventors: Tadaaki Miyazaki, Higashiyamato; Takao Ogino; Takahiro Kawagoe, both of Tokorozawa, all of Japan

[73] Assignee: Bridgestone Corporation, Tokyo, Japan

[21] Appl. No.: 330,268

[22] Filed: Mar. 29, 1989

[30] Foreign Application Priority Data

Apr. 7, 1988 [JP] Japan ................................. 63-83996

[51] Int. Cl.⁵ ............................................. H01M 10/40
[52] U.S. Cl. ....................................... 429/194; 429/217
[58] Field of Search ................................ 429/194, 217

[56] References Cited

U.S. PATENT DOCUMENTS 4,536,456  8/1985  Evans ................................. 429/194
4,786,499 11/1988  Slane et al. ...................... 429/194 X
4,803,137  2/1989  Miyazaki et al. .................... 429/194

Primary Examiner—Stephen J. Kalafut
Attorney, Agent, or Firm—Oblon, Spivak, McClelland, Maier & Neustadt

[57] ABSTRACT

A secondary cell comprising a metal oxide positive electrode, a lithium negative electrode, and a nonaqueous electrolyte containing lithium ions exhibits a high capacity and a long cycle life when the positive electrode has a limited capacity per unit area.

7 Claims, 4 Drawing Sheets

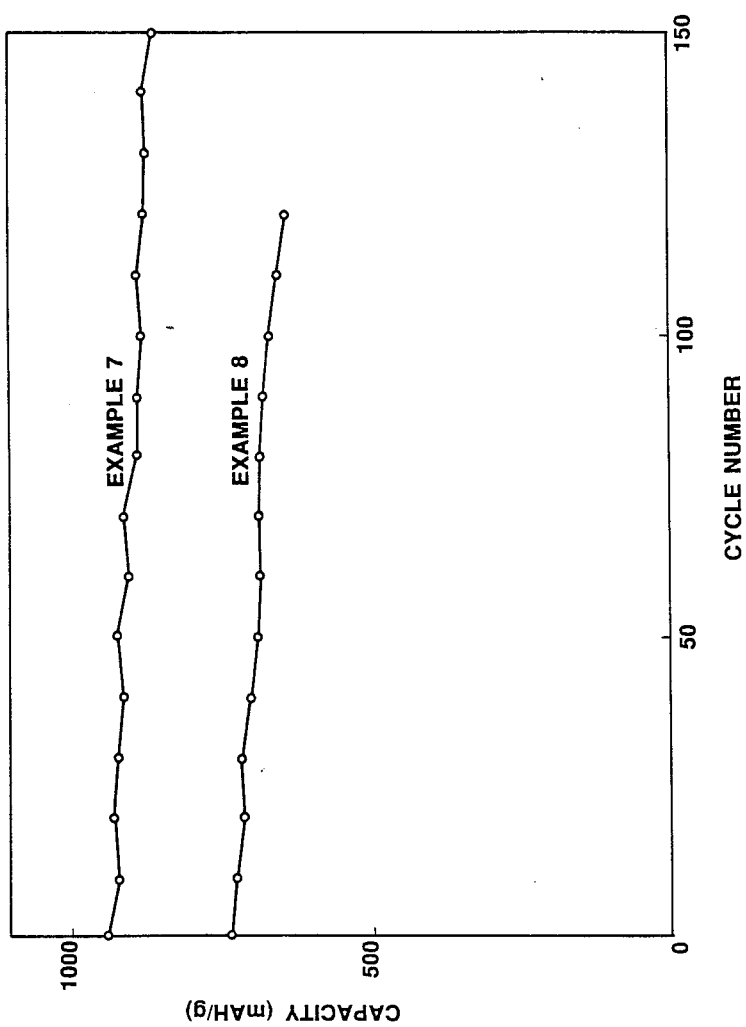

NONAQUEOUS ELECTROLYTE SECONDARY CELL

BACKGROUND OF THE INVENTION

1. Field of the Invention

This invention relates to a stable and reliable nonaqueous electrolyte secondary cell having a high energy density and an extended charge/discharge life.

1. Prior Art

In the prior art, a number of proposals were made for high energy density cells. Lithium cells using lithium as a negative electrode active material and fluorinated graphite or manganese dioxide as a positive electrode active material have been marketed. These cells are primary cells which cannot be recharged.

One example of secondary cells using lithium as a negative electrode active material is non-aqueous electrolyte secondary cells using vanadium oxide ($V_2O_5$) in the positive electrode as proposed, for example, in Japanese Patent Application Kokai No. 48-60240 and W. B. Ehner and W. C. Merz, Roc. 28th Power Sources Symp., June 1978, page 214.

These cells using metallic lithium as a negative electrode usually suffer from the problem that dendrite generates or the negative electrode is pulverized during charging. The cycle performance of the cell is fairly improved by using a lithium-aluminum alloy instead of metallic lithium as the negative electrode. The lithium-aluminum alloy, however, is too poorly flexible to apply to cylindrical cells having a spiral electrode structure.

SUMMARY OF THE INVENTION

An object of the present invention is to provide a stable and reliable nonaqueous electrolyte secondary cell having improved cycle performance and amenable to a spiral structure.

Making extensive investigations in order to develop a non-aqueous electrolyte lithium secondary cell of the cylindrical, paper or similar type capable of high performance, we have found that by reducing the capacity per unit area of an oxide positive electrode having a high potential such that no great load is applied to the negative electrode and electrolyte solution during charging and discharging operations, a current flow per unit area is reduced during normal C/10 charging such that lithium may mildly precipitate on the negative electrode and the amount of lithium precipitated per unit area is reduced, whereby degradation of the electrolyte solution and pulverization and dendrite formation of the negative electrode are controlled, resulting in improved cycle performance.

We have found that a non-aqueous electrolyte secondary cell comprising a metal oxide positive electrode capable of occluding and releasing lithium ions, a negative electrode containing at least 80 mol% of metallic lithium, and a non-aqueous electrolyte solution containing lithium ions can be improved in cycle performance by reducing the capacity per unit area of the positive electrode to 7 mAH/cm² or lower, especially to 0.5 to 5 mAH/cm².

According to the present invention, there is provided a nonaqueous electrolyte secondary cell comprising a positive electrode of a metal oxide capable of occluding and releasing lithium ions, the positive electrode having a capacity per unit area of up to 7 mAH/cm², a negative electrode containing at least 80 mol% of metallic lithium, and a nonaqueous electrolyte solution containing lithium ions.

The term capacity per unit area of the positive electrode is defined with the proviso that the lower voltage limit is up to 2 volts.

THE DRAWINGS

BRIEF DESCRIPTION OF THE DRAWINGS

The above and other objects, features, and advantages of the present invention will be better understood from the following description taken in conjunction with the accompanying drawings, in which:

FIG. 5 is a diagram showing the capacity of cells of Examples 7 and 8 as a function of cycles.

DETAILED DESCRIPTION OF THE INVENTION

Figure 1:
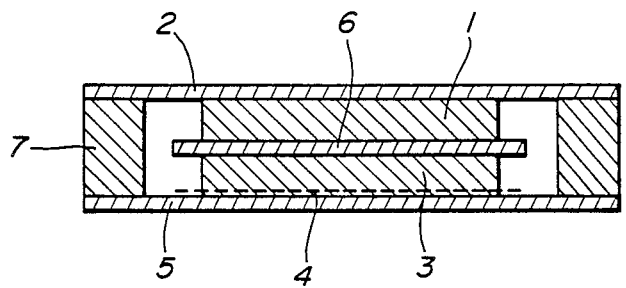
FIG. 1 is a cross-sectional view of a cell according to one embodiment of the present invention.

The nonaqueous electrolyte secondary cell of the present invention includes a positive electrode of a metal oxide, a negative electrode based on lithium, and a nonaqueous electrolyte solution containing lithium ions.

The metal oxide of the positive electrode is not particularly limited insofar as it can occlude and release lithium ions. Preferably, the metal oxide has a higher potential in the range of 3.5 to 2.0 volts. Examples of the metal oxide include $V_6O_{13}$, $Li_{(1+x)}V_3O_8$ wherein x ranges from $-0.3$ to $+0.3$, $Cr_2O_5$, $Cr_3O_8$, $Cr_6O_{15}$, $MoO_3$, $MoV_2O_8$, $Li_xM_xV_{(2-x)}O_5$ wherein M is Mo or W and $x<0.6$, $Li_yM_zV_{(2-z)}O_5$ wherein M is Mo or W and $y>z$ and $y<0.6$, amorphous materials containing at least 50 mol% of $V_2O_5$ such as $95V_2O_5/5TeO_2$ and $80V_2O_5/20-TiO_2$, amorphous materials containing at least 80 mol% of $MoV_2O_8$, $Li_xM_xV_{(2-x)}O_5$ or $Li_yM_zV_{(2-z)}O_5$ defined above, manganese oxides, for example, complex manganese oxides containing lithium in a Li/Mn ratio of from 3/10 to 8/10 and complex manganese oxides containing chromium, and spinel structured $LiMn_2O_4$.

In preparing positive electrodes using any of the abovementioned positive electrode materials or oxides, the particle size of the oxide material is not critical although high performance positive electrodes are obtained with an average particle size of up to 3 μm. More particularly, the positive electrode is prepared by mixing such oxide powder with a conductive agent such as acetylene black and a binder such as powder fluororesin, kneading the mixture with an organic solvent, and milling the composition in a roll mill followed by drying. The amount of the conductive agent used preferably ranges from about 3 to about 25 parts, more preferably from about 5 to about 15 parts by weight per 100 parts by weight of the oxide material. The positive electrode requires only a minimized amount of conductive agent because the oxide material itself is well conductive. The amount of the binder used preferably ranges from about 2 to about 25 parts by weight per 100 parts by weight of the oxide material.

According to the present invention, the positive electrode should have a capacity per unit area of up to 7 mAH/cm², preferably from about 0.5 to about 5 mAH/cm². One of the means for reducing the unit area capacity of the positive electrode is to increase the amount of the conductive aid (e.g., conductive carbon) or binder incorporated in the positive electrode composition. This approach is, however, less desirable because the cell capacity per unit volume is lowered. The desirable approach for reducing the unit area capacity of the positive electrode is to reduce the thickness of the positive electrode composition, that is, to form a thin layer of the positive electrode composition. Most desirably, the positive electrode composition is formed to a thickness of up to about 250 μm, preferably about preferably about 70 to about 150 μm.

The negative electrode used herein is an electrode containing at least 80 mol% of metallic lithium. The metals which can form the negative electrode with lithium are not particularly limited although they should preferably form an alloy with lithium. The most preferred alloying metal is aluminum.

The thickness of the negative electrode is not critical although it preferably ranges from about 40 to about 500 μm, more preferably about 100 to about 300 μm.

The electrolyte solution used in the secondary cell of the present invention is a solution of a lithium ion-containing electrolyte in a nonaqueous solvent. The electrolytes used herein include compounds of lithium cation with Group VA element halide anions such as $PF_6^-$, $AsF_6^-$, $SbF_6^-$, and $SbCl_6^-$; Group IIIA element halide anions such as $BF_4^-$ and $AlCl_4^-$; halide anions such as $I^-$ ($I_3^-$), $Br^-$ and $Cl^-$; perchlorate anions such as $ClO_4^-$; and anions such as $HF_2^-$, $CF_3SO_3^-$, and $SCN^-$. Some illustrative, non-limiting examples are $LiPF_6$, $LiAsF_6$, $LiSbF_6$, $LiBF_4$, $LiClO_4$, LiI, LiBr, LiCl, $LiAlCl_4$, $LiHF_2$, LiSCN, and $LiSO_3CF_3$. Preferred among them are $LiAsF_6$, $LiPF_6$, and $LiClO_4$, with $LiAsF_6$ and $LiPF_6$ being most preferred for the purpose of the invention. The electrolyte may preferably be contained in a concentration of from about 0.5 to about 3 moles per liter of the solvent, more preferably from about 1 to about 2 moles/liter.

The preferred nonaqueous solvents used herein are relatively highly polar solvents. Examples include propylene carbonate, ethylene carbonate, butylene carbonate, tetrahydrofuran, 2-methyltetrahydrofuran, dioxolan, dioxane, dimethoxyethane, glymes such as diethylene glycol dimethyl ether, lactones such as γ-butyrolactone, phosphate esters such as triethyl phosphate, sulfur compounds such as sulfolane and dimethyl sulfoxide, nitriles such as acetonitrile, amides such as dimethylformamide and dimethylacetamide, dimethyl sulfate, nitromethane, nitrobenzene, dichloroethane, and mixtures of two or more of them. Preferred among them are ethylene carbonate, propylene carbonate, butylene carbonate, tetrahydrofuran, 2-methyltetrahydrofuran, dimethoxyethane, dioxolan, and γ-butyrolactone, and mixtures of two or more of them. Most preferred is a solvent mixture of ethylene carbonate, propylene carbonate and up to 20% by volume, preferably 3 to 10% by volume of benzene.

The secondary cell of the present invention is generally constructed by interposing the electrolyte between the positive and negative electrodes. A separator may be interposed between the positive and negative electrodes in order to prevent the electrodes from contacting each other to cause current shortcircuit. The separator is preferably a porous material which can be impregnated with and allow passage of the electrolyte, for example, woven and non-woven fabrics and nets of synthetic resins such as polytetrafluoroethylene, polypropylene, and polyethylene.

The cells of the present invention may be of any types although they are preferred as cylindrical cells with a spiral structure and paper cells with a reduced thickness.

The secondary cells of the present invention have the advantages of high-current discharge and improved cycle performance as well as stability and reliability.

EXAMPLES

Examples of the present invention are given below by way of illustration and not by way of limitation.

Example 1

A positive electrode was prepared using $LiV_3O_8$ powder as the active material. To 100 parts by weight of the active material were added 20 parts by weight of acetylene black as a conductive agent and 10 parts by weight of fluoro-resin powder as a binder. The mixture was fully admixed and then kneaded with an organic solvent, milled to a thickness of about 500 μm through a roll mill, and then dried in vacuum at 150° C. The resulting sheet was further rolled through a rolling mill into a sheet of 100 μm thick. A coupon of 2 cm by 2 cm was cut out of the sheet and bonded to a stainless steel plate with a conductive adhesive containing carbon, obtaining a positive electrode.

A negative electrode was prepared by cutting a coupon of 2 cm by 2 cm out of a lithium foil of 100 μm thick and press bonding it to a stainless steel mesh. The press bonded assembly was further bonded to a stainless steel plate by spot welding.

The electrolyte solution used was a solution of 1 mol/liter lithium hexafluorophosphate ($LiPF_6$) in a mixture of ethylene carbonate, propylene carbonate and benzene in a volume ratio of 10:10:1.

A model cell as shown in FIG. 1 was fabricated using the above-prepared positive electrode, negative electrode, and electrolyte solution. The positive electrode was fully impregnated with the electrolyte solution by dipping in the solution for about half a day prior to fabrication.

FIG. 1 illustrates a cell structure. A positive electrode 1 is bonded with a conductive adhesive to a stainless steel positive electrode terminal plate 2 also serving as a current collector. A negative electrode 3 is press bonded to a stainless steel mesh 4, which is in turn spot welded to a stainless steel negative electrode terminal plate 5. A separator 6 in the form of a porous propylene film is disposed between the positive and negative electrodes 1 and 3. The positive and negative electrode terminal plates 2 and 5 at the periphery are sealed and insulated with a resinous sealant 7.

In fabricating the cell of this structure, the positive electrode was impregnated with the electrolyte solution as previously described and the separator was also impregnated with the same electrolyte solution.

The cell was subjected to charge/discharge cycles with a constant current of 2 milliamperes (mA) over the voltage range between the upper limit of 3.5 V and the lower limit of 2.0 V. The positive electrode was determined to have a discharge capacity per unit area of 4.2 mAH/cm².

The cell was further subjected to repeated charge/discharge cycles by charging it to 3.5 V with a constant current of 1.7 mA (0.42 mA/cm$^2$) and then discharging to 2 V at 3 mA. The capacity (mAH/g) was plotted as a function of cycles to give a curve in the diagram of FIG. 2.

Example 2

A cell was fabricated by the same procedure as in Example 1 except that the positive electrode composition of $LiV_3O_8$ was rolled to a thickness of 150 μm (second rolling) after drying and that $LiAsF_6$ was used as the electrolyte.

The cell was subjected to charge/discharge cycles under the same conditions as in Example 1 (constant current 2 mA, upper limit 3.5 V, lower limit 2.0 V). The positive electrode was determined to have a discharge capacity per unit area of 6 mAH/cm$^2$.

The cell was further subjected to repeated charge/discharge cycles by charging it to 3.5 V with a constant current of 2.4 mA (0.6 mA/cm$^2$) and then discharging to 2 V at 4 mA. The capacity was plotted as a function of cycles, obtaining a curve in the diagram of FIG. 2.

Example 3

A cell was fabricated by the same procedure as in Example 2 except that $V_6O_{13}$ was used as the positive electrode active material.

The cell was subjected to charge/discharge cycles under the same conditions as in Example 1 (constant current 2 mA, upper limit 3.5 V, lower limit 2.0 V). The positive electrode was determined to have a discharge capacity per unit area of 4.7 mAH/cm$^2$.

The cell was further subjected to repeated charge/discharge cycles by charging it to 3.5 V with a constant current of 1.9 mA (0.47 mA/cm$^2$) and then discharging to 2 V at 4 mA. The capacity was plotted as a function of cycles, obtaining a curve in the diagram of FIG. 2.

Comparative Example 1

A cell was fabricated by the same procedure as in Example 1 except that a lithium foil of 200 μm thick was used as the negative electrode and the 500-μm thick sheet which was once rolled and dried was used as the positive electrode without further rolling.

The cell was subjected to charge/discharge cycles under the same conditions as in Example 1 (constant current 2 mA, upper limit 3.5 V, lower limit 2.0 V). The discharge electrode was determined to have a capacity per unit area of 13 mAH/cm$^2$.

The cell was further subjected to repeated charge/discharge cycles by charging it to 3.5 V with a constant current of 5.2 mA (1.3 mA/cm$^2$) and then discharging to 2 V at 8 mA. The capacity was plotted as a function of cycles, obtaining a curve in the diagram of FIG. 2.

Comparative Example 2

A cell was fabricated by the same procedure as in Example 3 except that the positive electrode composition of $V_6O_{13}$ was rolled to a thickness of 300 μm (second rolling) after drying.

The cell was subjected to charge/discharge cycles under the same conditions as in Example 1 (constant current 2 mA, upper limit 3.5 V, lower limit 2.0 V). The positive electrode was determined to have a capacity per unit area of 9.1 mAH/cm$^2$.

The cell was further subjected to repeated charge/discharge cycles by charging it to 3.5 V with a constant current of 3.6 mA (0.9 mA/cm$^2$) and then discharging to 2 V with a constant current of 7 mA. The capacity was plotted as a function of cycles, obtaining a curve in the diagram of FIG. 2.

Example 4

A positive electrode active material was prepared by adding 1.5% by weight of $(NH_4)_2SO_4$ to 4 grams of crystalline $Cr_3O_8$. The mixture was added to 100 ml of water and then allowed to stand for one day in an autoclave at 250° C. Removal of water left a powder which was ready for use as the positive electrode active material.

A cell was fabricated by the same procedure as in Example 1 except that the positive electrode was prepared from the above-prepared active material.

The cell was subjected to several charge/discharge cycles by discharging it to 2.5 V with a constant current of 2 mA and then charging to 3.8 V. The positive electrode was determined to have a capacity per unit area of 4.7 mAH/cm$^2$.

The cell was further subjected to repeated charge/discharge cycles by charging it to 3.8 V with a constant current of 1.8 mA (0.45 mA/cm$^2$) and then discharging to 2.5 V with a constant current of 3.5 mA. The capacity was plotted as a function of cycles, obtaining a curve in the diagram of FIG. 3.

Example 5

A cell was fabricated by the same procedure as in Example 1 except that amorphous $V_2O_5$ powder containing 5 mol% of $TeO2$ was used as the positive electrode active material and that the positive electrode composition thereof was finally rolled to a thickness of 200 μm (second rolling).

The cell was subjected to charge/discharge cycles under the same conditions as in Example 1. The positive electrode exhibted a discharge capacity per unit area of 4.8 mAH/cm$^2$ at the second and subsequent cycles.

The cell was further subjected to repeated charge/discharge cycles by charging it to 3.5 V with a constant current of 2.0 mA (0.5 mA/cm$^2$) and then discharging to 2.0 V at 4 mA. The capacity was plotted as a function of cycles, obtaining a curve in the diagram of FIG. 3.

Example 6

A cell was fabricated by the same procedure as in Example 2 except that the positive electrode active material was prepared by baking a mixture of 4 parts by weight of lithium hydroxide LiOH and 6 parts by weight of manganese dioxide $MnO2$ at 375° C. for 24 hours.

The cell was subjected to charge/discharge cycles under the same conditions as in Example 1. The positive electrode exhibited a discharge capacity per unit area of 4.0 mAH/hu 2.

The cell was further subjected to repeated charge/discharge cycles by charging it to 3.5 V with a constant current of 1.6 mA (0.4 mA/cm$^2$) and then discharging to 2.0 V at 3 mA. The capacity was plotted as a function of cycles, obtaining a curve in the diagram of FIG. 3.

Comparative Example 3

A cell was fabricated by the same procedure as in Example 4 except that the positive electrode composition of $Cr_3O_8$ was rolled to a thickness of 350 μm (second rolling).

The cell was subjected to charge/discharge cycles under the same conditions as in Example 1. The positive electrode exhibited a capacity per unit area of 12 mAH/cm$^2$.

The cell was further subjected to repeated charge/discharge cycles by charging it to 3.8 V with a constant current of 4.8 mA (1.2 mA/cm2) and then dischargint to 2.5 V with a constant current of 5 mA. The capacity was plotted as a function of cycles, obtaining a curve in the diagram of FIG. 3.

Comparative Example 4

A cell was fabricated by the same procedure as in Example 5 except that the positive electrode composition of V$_2$O$_5$ was rolled to a thickness of 350 μm (second rolling).

The cell was subjected to charge/discharge cycles under the same conditions as in Example 1. The positive electrode exhibited a capacity per unit area of 8.5 mAH/cm$^2$.

The cell was further subjected to repeated charge/discharge cycles by charging it to 3.5 V with a constant current of 3.5 mA (0.85 mA/cm$^2$) and then discharging to 2.0 V with a constant current of 5 mA. The capacity was plotted as a function of cycles, obtaining a curve in the diagram of FIG. 3.

Comparative Example 5

A cell was fabricated by the same procedure as in Example 6 except that the positive electrode composition was rolled to a thickness of 300 μm (second rolling).

The cell was subjected to charge/discharge cycles under the same conditions as in Example 1. The positive electrode exhibited a capacity per unit area of 7.6 mAH/cm$^2$.

The cell was further subjected to repeated charge/discharge cycles by charging it to 3.5 V with a constant current of 3 mA (0.76 mA/cm$^2$) and then discharging to 2.0 V with a constant current of 5 mA. The capacity was plotted as a function of cycles, obtaining a curve in the diagram of FIG. 3.

Example 7

A positive electrode was prepared from the same LiV$_3$O$_8$ composition as in Example 1. A 100-μm thick sheet of the composition was bonded to a stainless steel foil of 10 μm thick with a conductive adhesive. A lithium foil of 100 μm thick was used as a negative electrode. A sandwich of the positive and negative electrodes with a separator therebetween was spirally wound on a core, obtaining an electrode roll. The roll was placed in a cylindrical cell container. The container was filled with a nonaqueous electrolyte solution of 1 mol/liter LiPF$_6$ in a 1/1 mixture of ethylene carbonate and propylene carbonate. The container was finally sealed, obtaining a rechargeable AAA type battery having a height of 50.5 mm and a diameter of 14.5 mm as shown in FIG. 4.

Figure 4:
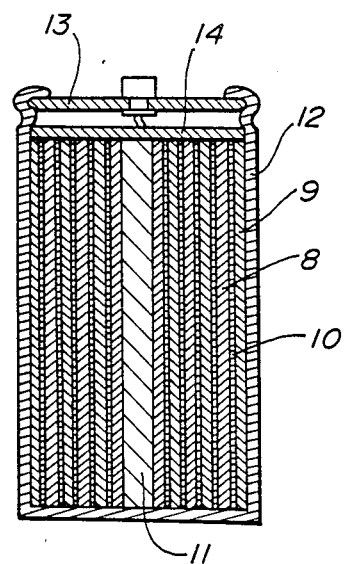
FIG. 4 is a cross-sectional view of a cell according to another embodiment of the present invention.

FIG. 4 illustrates the structure of a roll type cell in which a roll of a positive electrode 8, a separator 10 and a negative electrode 9 on a core 11 is received in a container 12. A sealing gasket 13 is in sealing engagement with an upper opening of the container 12. A diaphragm 14 is positioned on the top of the roll.

The battery was subjected to charge/discharge cycles with a constant current of 50 mA between the discharge terminating voltage of 2.0 V and the charge terminating voltage of 3.5 V. The positive electrode exhibited a discharge capacity of 940 mAH, which corresponded to 3.2 mAH/cm$^2$.

The battery was further subjected to repeated charge/discharge cycles by charging it to 3.5 V with a constant current of 100 mA and then discharging to 2.0 V with a constant current of 200 mA. The capacity was plotted as a function of cycles, obtaining a curve in the diagram of FIG. 5.

Example 8

A rechargeable AAA type battery was fabricated by the same procedure as in Example 7 except that the manganese oxide used in Example 6 was used as the positive electrode active material and that the positive electrode composition was rolled to a thickness of 150 μm.

The battery was subjected to several charge/discharge cycles with a constant current of 50 mA between the discharge terminating voltage of 2.0 V and the charge terminating voltage of 3.5 V. The positive electrode exhibited a discharge capacity of 700 mAH, which corresponded to 3.0 mAH/cm$^2$.

The battery was further subjected to repeated charge/discharge cycles by charging it to 3.5 V with a constant current of 70 mA and then discharging to 2.0 V with a constant current of 200 mA. The capacity was plotted as a function of cycles, obtaining a curve in the diagram of FIG. 5.

Figure 2:
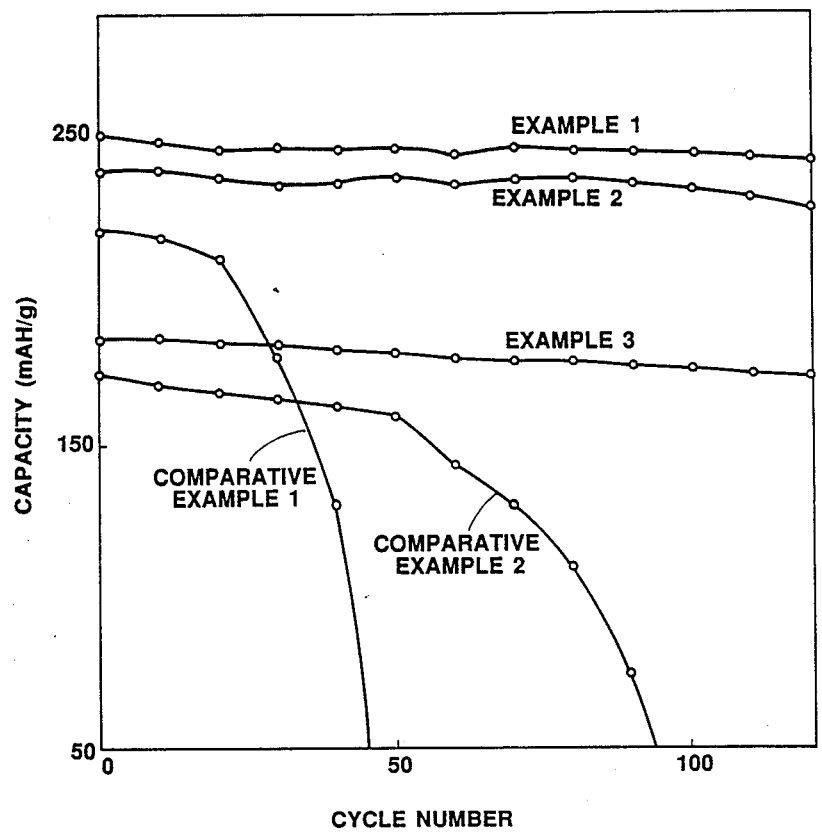
FIG. 2 is a diagram showing the capacity of cells of Examples 1–3 and Comparative Examples 1–2 as a function of cycles.
Figure 3:
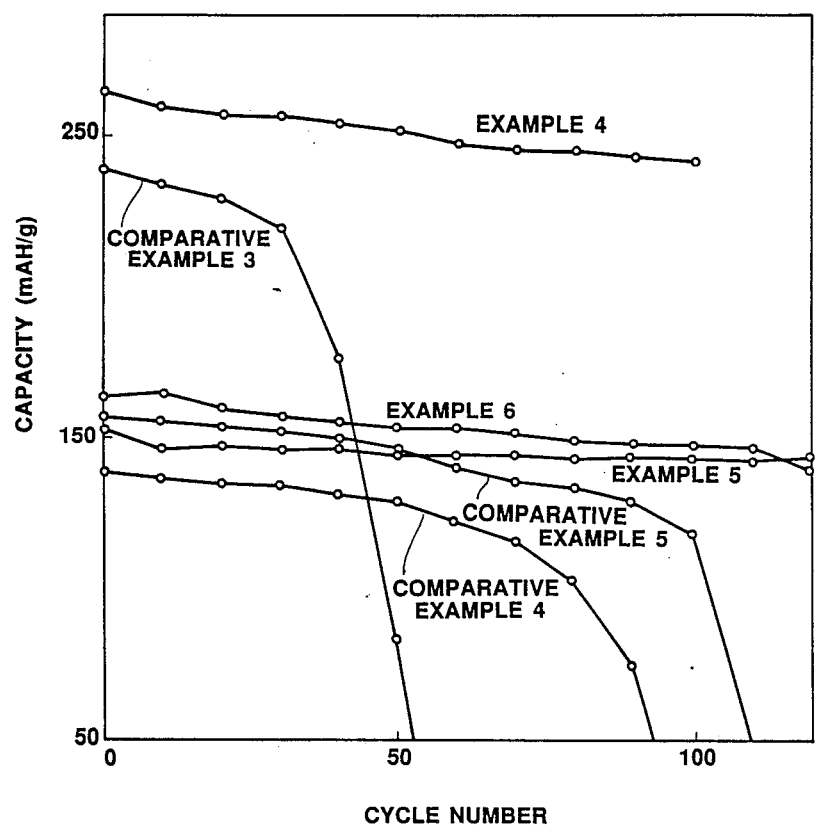
FIG. 3 is a diagram showing the capacity of cells of Examples 4–6 and Comparative Examples 3–6 as a function of cycles.

As evident from the diagrams of FIGS. 2, 3, and 5, the cells of the present invention have an increased capacity and an extended cycle life. The present invention is commercially advantageous in that there is obtained a nonaqueous electrolyte secondary cell having a high capacity and a long cycle life.

While preferred embodiments have been described, variations thereto will occur to those skilled in the art within the scope of the invention.

What is claimed is:

1. A nonaqueous electrolyte secondary cell comprising:
   a positive electrode of a metal oxide capable of occluding and releasing lithium ions,
   a negative electrode containing at least 80 mol% of metallic lithium, and
   a nonaqueous electrolyte solution containing lithium ions, wherein
   the positive electrode has a capcity per unit area of up to 7 mAH/cm$^2$, and a thickness of 50–250 microns.

2. The cell of claim 1 wherein the negative electrode has a thickness of about 40 to about 500 μm.

3. The cell of any one of claims 1 to 4 wherein the nonaqueous electrolyte solution consists essentially of
   an electrolyte selected from the group consisting of LiAsF$_6$, LiPF$_6$, and LiClO$_4$ and mixtures thereof, and
   a nonaqueous solvent.

4. The cell of claim 5 wherein the nonaqueous solvent is selected from the group consisting of ethylene carbonate, propylene carbonate, butylene carbonate, tetrahydrofuran, 2-methyltetrahydrofuran, dimethoxyethane, dioxolan, and γ-butyrolactone and mixtures thereof.

5. The cell of claim 3 wherein the nonaqueous solvent is a mixture of ethylene carbonate, propylene carbonate, and upt o 20% by volume of benzene.

6. The cell of claim 1, wherein the positive electrode has a capcity per unit area of 0.5–5 mAH/cm$^2$.

7. The cell of claim 1, wherein the positive electrode has a thickness of about 70 to about 150 microns.

* * * * *